(12) United States Patent
Shimoda et al.

(10) Patent No.: US 8,846,259 B2
(45) Date of Patent: Sep. 30, 2014

(54) METHOD OF CONTROLLING OUTPUT OF FUEL CELL SYSTEM AND VEHICLE WITH FUEL CELL SYSTEM

(75) Inventors: Shinsuke Shimoda, Utsunomiya (JP); Tomoyoshi Iino, Haga-gun (JP); Hibiki Saeki, Utsunomiya (JP); Hiroshi Morikawa, Shioya-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 957 days.

(21) Appl. No.: 12/750,154

(22) Filed: Mar. 30, 2010

(65) Prior Publication Data

US 2010/0248051 A1    Sep. 30, 2010

(30) Foreign Application Priority Data

Mar. 30, 2009  (JP) .................. 2009-083415
Jun. 29, 2009  (JP) .................. 2009-153777

(51) Int. Cl.
*H01M 8/04* (2006.01)
*B60L 11/18* (2006.01)
*H01M 16/00* (2006.01)

(52) U.S. Cl.
CPC ....... *B60L 11/1881* (2013.01); *H01M 8/04619* (2013.01); *H01M 8/04947* (2013.01); *H01M 8/04559* (2013.01); *H01M 8/04589* (2013.01); *H01M 8/0488* (2013.01); *H01M 8/0491* (2013.01); *H01M 8/0494* (2013.01); *H01M 16/003* (2013.01); *Y02E 60/50* (2013.01); *Y02T 90/34* (2013.01)
USPC ........................................ 429/430

(58) Field of Classification Search
CPC ............... H01M 8/04619; H01M 8/04626; H01M 8/0494; H01M 8/04947
USPC .................................. 429/428, 430
See application file for complete search history.

(56) References Cited

U.S. PATENT DOCUMENTS

| | | | |
|---|---|---|---|
| 2002/0189872 A1* | 12/2002 | Hasuka et al. ............... | 180/65.3 |
| 2006/0102397 A1 | 5/2006 | Buck et al. | |
| 2007/0179636 A1 | 8/2007 | Shige | |
| 2008/0085430 A1 | 4/2008 | MacBain et al. | |
| 2010/0068577 A1 | 3/2010 | Umayahara et al. | |

FOREIGN PATENT DOCUMENTS

| | | |
|---|---|---|
| EP | 1361621 A2 | 11/2003 |
| JP | 06-243882 | 9/1994 |
| JP | 7-272736 | 10/1995 |

(Continued)

OTHER PUBLICATIONS

English translation of WP 1 361 621.*

(Continued)

*Primary Examiner* — Maria J Laios
(74) *Attorney, Agent, or Firm* — Nelson Mullins Riley & Scarborough LLP; Anthony A. Laurentano

(57) ABSTRACT

A fuel cell system has different allowable changes per unit time in an operation range of a fuel cell, in both a first output range of the fuel cell and a second output range of the fuel cell, the second output range being lower than the first output range. The allowable change per unit time in the output of the fuel cell in the second output range is smaller than the allowable change per unit time in the output of the fuel cell in the first output range.

6 Claims, 12 Drawing Sheets

(56) References Cited

FOREIGN PATENT DOCUMENTS

| | | | | |
|---|---|---|---|---|
| JP | 2004-172055 | A | 6/2004 | |
| JP | 2006-202695 | | 8/2006 | |
| JP | 2007-220323 | | 8/2007 | |
| JP | 2008-130424 | * | 6/2008 | .............. H01M 8/04 |
| JP | 2008-218340 | | 9/2008 | |

OTHER PUBLICATIONS

Machine translation of JP2008-130424.*
European Search Report for Application No. 10157932.4, dated Aug. 4, 2010.
Japanese Office Action for Application No. 2009-153777, dated My 10, 2011.

* cited by examiner

FIG. 7

|  |  | LOW OUTPUT | MEDIUM OUTPUT | HIGH OUTPUT |
|---|---|---|---|---|
| Pfc_com | OUTPUT CHANGE | CONSTANT | CONSTANT | CONSTANT |
| | VOLTAGE CHANGE | LARGE | MEDIUM | SMALL |
| Pfc | OUTPUT CHANGE | SMALL | MEDIUM | LARGE |
| | VOLTAGE CHANGE | CONSTANT | CONSTANT | CONSTANT |

METHOD OF CONTROLLING OUTPUT OF FUEL CELL SYSTEM AND VEHICLE WITH FUEL CELL SYSTEM

CROSS-REFERENCE TO RELATED APPLICATION

This application is based upon and claims the benefit of priority from Japanese Patent Applications No. 2009-083415 filed on Mar. 30, 2009 and No. 2009-153777 filed on Jun. 29, 2009, of which the contents are incorporated herein by reference.

BACKGROUND OF THE INVENTION

1. Field of the Invention

The present invention relates to a method of controlling the output of a fuel cell system including a fuel cell and a load, as well as to a vehicle incorporating such a fuel cell system therein. More particularly, the present invention concerns a method of controlling the output of a fuel cell system in order to effectively utilize the output of the fuel cell, while at the same time suppressing deterioration of the fuel cell.

2. Description of the Related Art

In recent years, intensive efforts have been made to carry out research and development on fuel cells. One of the themes of such research and development is how to control the output of a fuel cell. There have been developed technologies for controlling fuel cell output (see, for example, Japanese Laid-Open Patent Publication No. 06-243882, Japanese Laid-Open Patent Publication No. 2006-202695, and U.S. Patent Application Publication No. 2007/0179636).

According to Japanese Laid-Open Patent Publication No. 06-243882, when the voltage of a fuel cell becomes lower than a threshold value, the fuel cell is turned off in order to prevent deterioration of the fuel cell (see, for example, the summary section of the publication).

According to Japanese Laid-Open Patent Publication No. 2006-202695, in order to cancel a limitation on the output of a fuel cell (20) without adversely affecting the driving performance of a vehicle on which the fuel cell is mounted, the limitation on the output is canceled only when an electric power amount that can be output from the fuel cell while output of the fuel cell is limited exceeds the electric power amount which the fuel cell is required to produce (see, for example, the summary section of the publication).

According to U.S. Patent Application Publication No. 2007/0179636, an output limit (Wout) of a fuel cell (30) is set for purposes of protecting the fuel cell, and output of the fuel cell is limited based on the output limit (Wout) (see, for example, paragraphs [0003] and [0029]). The output limit (Wout) is calculated based on fuel cell temperature (Tfc), inter-cell voltage (Vcel), fuel cell inter-terminal voltage (Vfc), fuel cell electric current (Ifc), and air compressor temperature (Tac) (see, for example, paragraph [0029]).

However, according to Japanese Laid-Open Patent Publication No. 06-243882, Japanese Laid-Open Patent Publication No. 2006-202695, and U.S. Patent Application Publication No. 2007/0179636, sufficient attempts have not been made to suppress deterioration of the fuel cell, and to effectively utilize the output of the fuel cell.

SUMMARY OF THE INVENTION

An object of the present invention is to provide a method of controlling the output of a fuel cell system in order to effectively utilize the fuel cell output, while at the same time suppressing deterioration of the fuel cell. Another object of the present invention is to provide a vehicle incorporating such a fuel cell system therein.

According to the present invention, there is provided a method of controlling output of a fuel cell system including a fuel cell and a load, comprising the steps of setting different allowable changes per unit time in an operation range of the fuel cell in both a first output range of the fuel cell and a second output range of the fuel cell, the second output range being lower than the first output range, and setting the allowable change per unit time in the output of the fuel cell in the second output range so as to be smaller than the allowable change per unit time in the output of the fuel cell in the first output range.

According to the present invention, a change in the voltage of the fuel cell is limited in order to effectively utilize the output of the fuel cell, while at the same time deterioration of the fuel cell is suppressed.

More specifically, according to the characteristics of a general fuel cell, when the output of the fuel cell becomes lower, the voltage of the fuel cell changes quadratically. Stated otherwise, as the output of the fuel cell becomes lower, the change in the voltage of the fuel cell, which depends on the change in the output of the fuel cell, becomes greater. As the voltage of the fuel cell changes more greatly, the fuel cell deteriorates even more. According to the present invention, an allowable change per unit time in the output of the fuel cell within the second lower output range is set to be smaller than an allowable change per unit time in the output of the fuel cell within the first higher output range. Thus, the change in the voltage of the fuel cell is limited, thereby suppressing deterioration of the fuel cell.

Conversely, as the output of the fuel cell becomes higher, the change in the voltage of the fuel cell, which depends on the change in the output of the fuel cell, becomes smaller. When the output of the fuel cell becomes higher, therefore, by increasing a change in the output of the fuel cell, the change in the voltage of the fuel cell does not become larger than when the output of the fuel cell is lower. According to the present invention, an allowable output change per unit time of the fuel cell within the first higher output range is set to be greater than the allowable output change per unit time of the fuel cell within the second lower output range. Therefore, in the first higher output range, which comparatively does not tend to cause deterioration of the fuel cell, the output performance of the fuel cell can be produced more efficiently, and thus the output of the fuel cell can be utilized effectively.

The allowable change per unit time in the output of the fuel cell in the second output range may be determined such that a change per unit time in the voltage of the fuel cell is kept within a constant value, and a change per unit time in the voltage of the fuel cell in the first output range is not limited, or may be limited so as to be kept within a value greater than the constant value. Thus, even if the current-voltage characteristic of the fuel cell changes due to deterioration of the fuel cell, thus causing the voltage of the fuel cell to change greatly with respect to a change in the output current of the fuel cell, it is still possible to maintain the change per unit time in the voltage of the fuel cell at a constant value.

The fuel cell system may comprise a system for determining a target voltage of the fuel cell based on a target electric power or a target current of the fuel cell, wherein the method further comprises a step of performing a feedback control process for bringing the voltage of the fuel cell into conformity with the target voltage with a DC/DC converter. In this case, the change per unit time in the output of the fuel cell in the first output range and the second output range may fall within an allowable range by limiting the target electric power or the target current. Consequently, changes in the target electric power or the target current of the fuel cell are limited prior to calculation of a target voltage for the DC/DC converter. It is thus possible to simplify computational efforts, more so than if the limitation of such changes were reflected in the calculation of the target voltage for the DC/DC converter.

The fuel cell system may further include a battery. In this case, when the output of the fuel cell alone fails to meet an output request from the fuel cell system, any shortage of the output request may be compensated for by an output of the battery. Accordingly, deterioration of the fuel cell can be suppressed, while at the same time the output request from the fuel cell system can be met.

Alternatively, a change per unit time in the voltage of the fuel cell may be limited in order to limit the output of the fuel cell. The output of the fuel cell can therefore be controlled effectively through a simple control process.

According to the present invention, there also is provided a vehicle incorporating a fuel cell system including a fuel cell and a load, wherein the fuel cell system comprises a control apparatus for setting different allowable changes per unit time in an operation range of the fuel cell in both a first output range of the fuel cell and a second output range of the fuel cell, the second output range being lower than the first output range, and for setting the allowable change per unit time in the output of the fuel cell in the second output range so as to be smaller than the allowable change per unit time in the output of the fuel cell in the first output range.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 7 is a table of output changes and voltage changes, classified by different output levels, for the output of the fuel cell according to the comparative example, and the output of the fuel cell according to the first embodiment;

DESCRIPTION OF THE PREFERRED EMBODIMENTS

A. First Embodiment

1. Description of Overall Arrangement

[Overall Arrangement]

Figure 1:
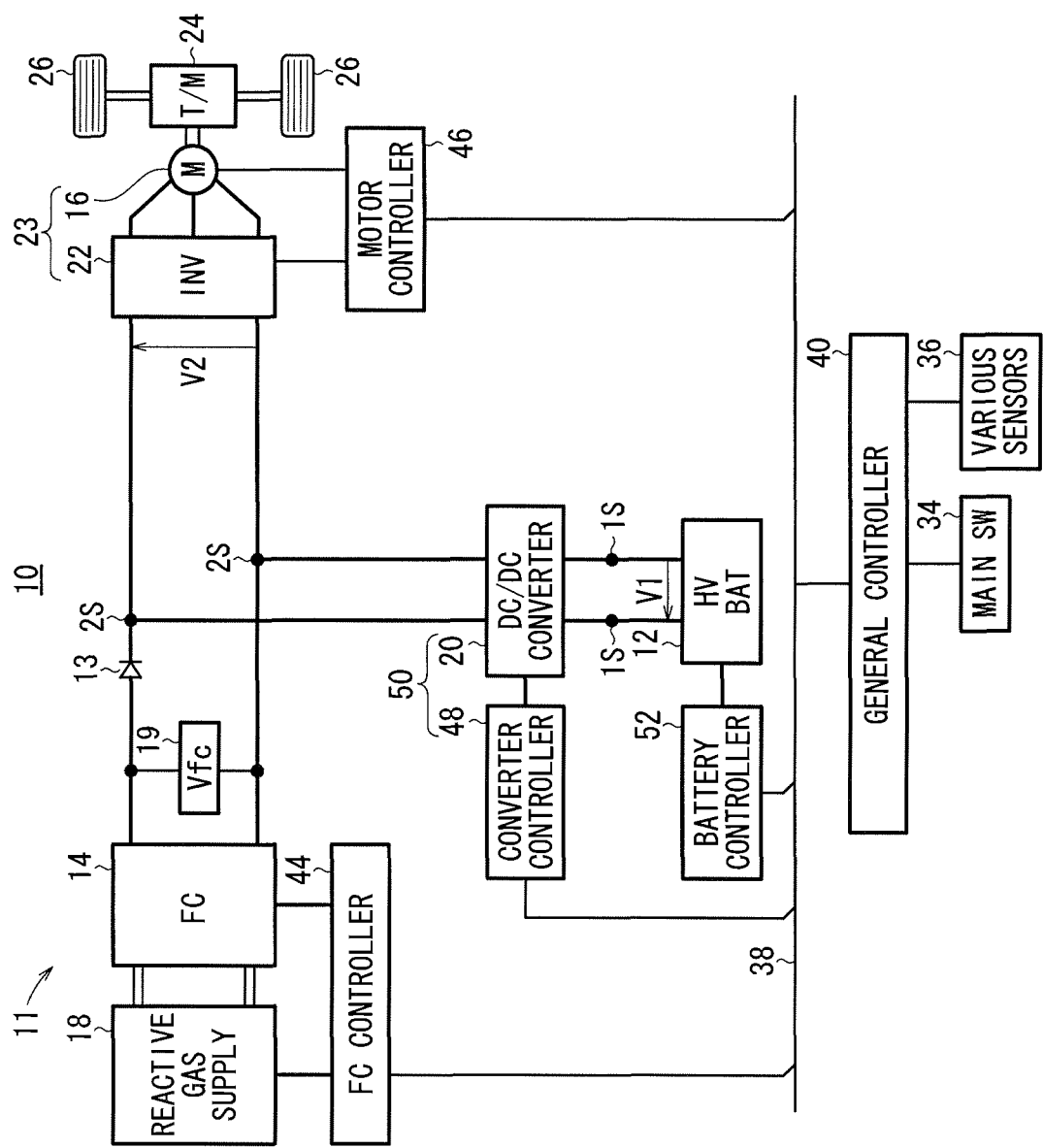
FIG. 1 is a block diagram of a fuel cell vehicle incorporating a fuel cell system in which an output control method according to a first embodiment of the present invention is carried out.

FIG. 1 is a block diagram of a fuel cell vehicle 10 (hereinafter also referred to as "FC vehicle 10") incorporating a fuel cell system 11 in which an output control method according to a first embodiment of the present invention is carried out.

The FC vehicle 10 basically comprises a hybrid DC power supply apparatus, including a battery 12 as a first DC power supply apparatus for generating a primary voltage V1 between primary terminals 1S, a fuel cell 14 as a second DC power supply apparatus for generating a secondary voltage V2 between secondary terminals 2S, and a travel motor 16 for propelling the FC vehicle 10. The propulsive motor 16 serves as a load, which is supplied with electric power from the hybrid DC power supply apparatus.

[Fuel Cell and Fuel Cell System]

The fuel cell 14 comprises a stacked structure of cells each having a solid polymer electrolyte membrane sandwiched between an anode and a cathode, which are disposed one on each side of the solid polymer electrolyte membrane. The fuel cell 14 is connected by pipes to a reactant gas supply 18. The reactant gas supply 18 includes a hydrogen tank for storing hydrogen (fuel gas) as a reactant gas, and a compressor for compressing air (oxygen-containing gas) that serves as another reactant gas. When the reactant gas supply 18 supplies hydrogen and air to the fuel cell 14, the hydrogen and air undergo an electrochemical reaction in the fuel cell, thereby generating an electric current, which is supplied through a diode 13 to the motor 16 and the battery 12.

The fuel cell 14 has an output voltage (hereinafter also referred to as "FC voltage Vfc") [V], which is detected by a voltage sensor 19 connected across the fuel cell 14.

The fuel cell system 11 comprises the fuel cell 14, the reactant gas supply 18, and a fuel cell controller 44 (hereinafter also referred to as "FC controller 44") for controlling the fuel cell 14 and the reactant gas supply 18.

[DC/DC Converter]

A DC/DC converter 20 comprises a chopper-type voltage converter having one set of terminals connected to the battery 12 and another set of terminals connected to secondary terminals 2S, which serve as a junction between the fuel cell 14 and the motor 16.

The DC/DC converter 20 serves as a buck-boost converter for converting (increasing) the primary voltage V1 to result in the secondary voltage V2 (V1≤V2), and for converting (reducing) the secondary voltage V2 to result in the primary voltage V1.

[Inverter, Motor, and Drive System]

An inverter 22, which is of a three-phase full-bridge configuration, performs AC/DC conversion. More specifically, the inverter 22 converts a DC current from the hybrid DC power supply apparatus into a three-phase AC current and supplies the three-phase AC current to the motor 16. The inverter also converts a three-phase AC current generated by the motor 16 in a regenerative mode into a DC current, and supplies the DC current to the battery 12 through the secondary terminals 2S, the DC/DC converter 20, and the primary terminals 1S, thereby charging the battery 12.

When energized, the motor 16 causes a transmission 24 to rotate the wheels 26 of the FC vehicle 10. The inverter 22 and the motor 16 shall collectively be referred to as a load 23.

[High-Voltage Battery]

The battery 12, which is connected to the primary terminals 1S, is a high-voltage battery serving as an electric energy storage, and may comprise a lithium ion secondary cell, a capacitor, or the like. In the first embodiment, the battery 12 comprises a lithium ion secondary cell.

[Various Sensors, Main Switch, and Communication Line]

A main switch (power supply switch) 34 and various sensors 36 are connected to a general controller 40. The main switch 34 serves as an ignition switch for turning on (activating or starting) and turning off (deactivating) the FC vehicle 10 and the fuel cell system 11. The various sensors 36 detect state information representative of a vehicle state, an environmental state, etc. A communication line 38 comprises a CAN (Controller Area Network) that serves as an intravehicular LAN.

[Controller]

The general controller 40, the FC controller 44, a motor controller 46, a converter controller 48, and a battery controller 52 are connected respectively to the communication line 38. The DC/DC converter 20 and the converter controller 48, which controls the DC/DC converter 20, jointly make up a DC/DC converter apparatus 50.

The general controller 40, the FC controller 44, the motor controller 46, the converter controller 48, and the battery controller 52 each include microcomputers, respectively, and detect and share state information from various switches including the main switch 34 and the various sensors 36. The general controller 40, the FC controller 44, the motor controller 46, the converter controller 48, and the battery controller 52 operate collectively as a function performing section (function performing means) for performing various functions when CPUs of the microcomputers are supplied with state information from the switches and sensors, and information (commands, etc.) from other controllers, and based thereon, execute programs stored in memories (ROMs) of the microcomputers. The general controller 40, the FC controller 44, the motor controller 46, the converter controller 48, and the battery controller 52 include, in addition to the CPUs and memories thereof, timers and input/output interfaces, including A/D converters, D/A converters, etc.

2. Description of Detailed Arrangement and Operation

[Arrangement of DC/DC Converter Apparatus]

Figure 2:
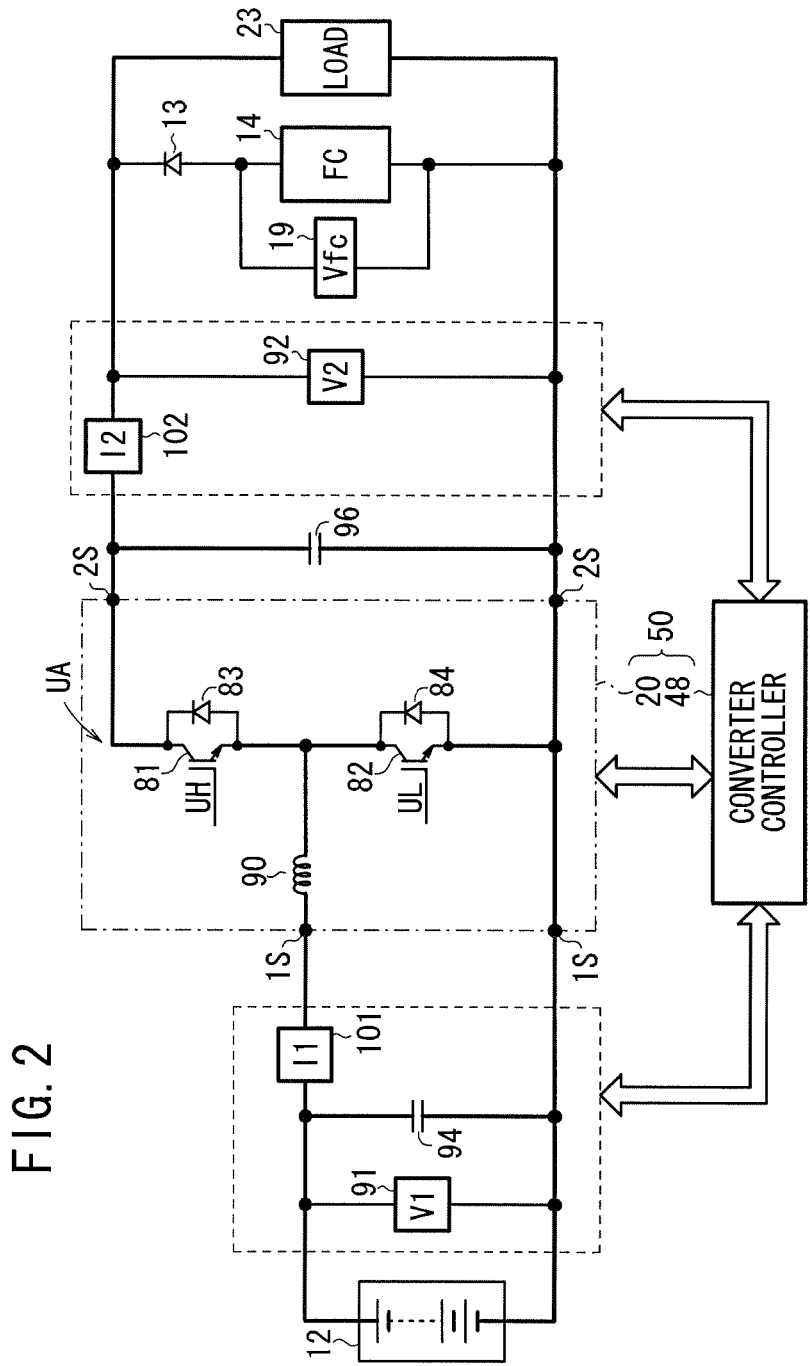
FIG. 2 is a circuit diagram, partially in block form, of a detailed circuit arrangement of a DC/DC converter mounted on the fuel cell vehicle according to the first embodiment.

FIG. 2 shows the DC/DC converter 20 in detail. As shown in FIG. 2, the DC/DC converter 20 comprises a phase arm UA connected between the primary terminals 1S and the secondary terminals 2S, and a reactor 90.

The phase arm US comprises upper arm devices including an upper arm switching element 81 and a diode 83, and lower arm devices including a lower arm switching element 82 and a diode 84.

The upper arm switching element 81 and the lower arm switching element 82 comprise MOSFETs, IGBTs, or the like, respectively.

The reactor 90 is inserted between a midpoint (common junction) of the phase arm UA and the positive terminal of the battery 12. The reactor 90 discharges and stores energy when the DC/DC converter 20 converts between the primary voltage V1 and the secondary voltage V2.

The upper arm switching element 81 is turned on by a high level of a gate drive signal (drive voltage) UH, which is output from the converter controller 48, while the lower arm switching element 82 is turned on by a high level of a gate drive signal (drive voltage) UL, which is output from the converter controller 48. The converter controller 48 detects the primary voltage V1 with a voltage sensor 91 connected in parallel to a smoothing capacitor 94 on the primary side across the battery 12, detects a primary current I1 to and from the battery 12 with a current sensor 101 connected to one of the primary terminals 1S, detects the secondary voltage V2 with a voltage sensor 92 connected in parallel to a smoothing capacitor 96 on the secondary side across the fuel cell 14, and detects a secondary current I2 from the fuel cell 14 with a current sensor 102 connected to one of the secondary terminal 2S.

[Operation of DC/DC Converter Apparatus]

Operation of the DC/DC converter apparatus 50 will be described below.

(Basic Voltage Control of the DC/DC Converter Apparatus 50)

Figure 3:
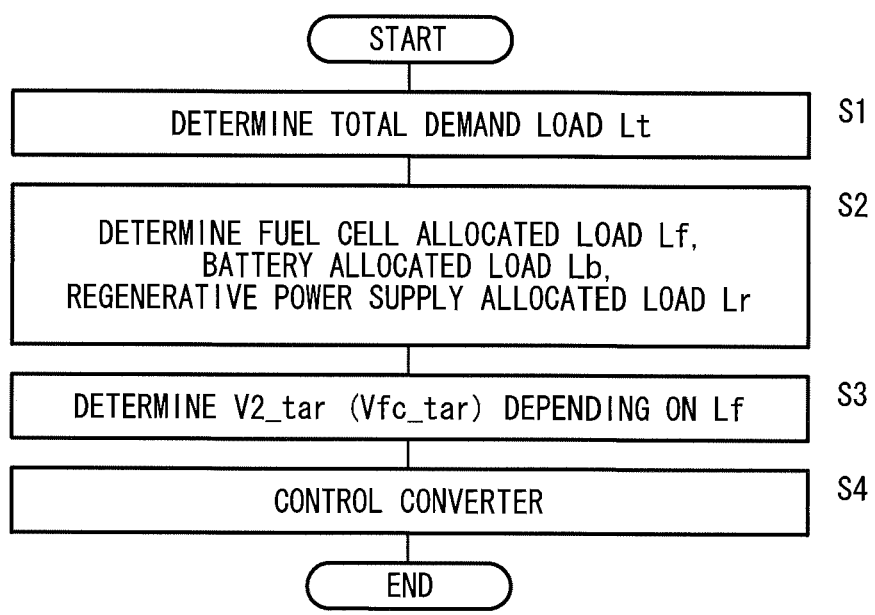
FIG. 3 is a flowchart of a basic control sequence of the DC/DC converter mounted on the fuel cell vehicle.

FIG. 3 is a flowchart of a basic control sequence of the DC/DC converter 20, which is controlled by the DC/DC converter apparatus 50.

The general controller 40 determines a total demand load Lt on the FC vehicle 10 based on the state of the fuel cell 14, the state of the battery 12, the state of the motor 16, and input signals from the switches and sensors (load demands), determines allocations (shares) of a fuel cell allocated load (demand output) Lf to be allocated to the fuel cell 14, a battery allocated load (demand output) Lb to be allocated to the battery 12, and a regenerative power supply allocated load (demand output) Lr to be allocated to the regenerative power supply, through an arbitration process based on the total demand load Lt, and sends commands indicative of the determined allocations to the FC controller 44, the motor controller 46, and the converter controller 48.

In step S1, the general controller 40 determines (calculates) a total demand load Lt from the power demand of the motor 16 and the power demand of the reactant gas supply 18 (the air compressor, etc.), both of which represent load demands. In step S2, the general controller 40 determines allocations of a fuel cell allocated load Lf, a battery allocated load Lb, and a regenerative power supply allocated load Lr, for thereby outputting the determined total demand load Lt.

In step S3, the converter controller 48 determines a target value (target FC voltage Vfc_tar) for the voltage (FC voltage Vfc) generated by the fuel cell 14, which herein represents a target value (target secondary voltage V2_tar) for the secondary voltage V2 depending on the fuel cell allocated load Lf.

After having determined the target secondary voltage V2_tar, the converter controller 48 controls the DC/DC converter 20 to achieve the determined target secondary voltage V2_tar in step S4. The DC/DC converter 20 then operates in a voltage increasing mode and in a voltage reducing mode.

The secondary voltage V2 and the primary voltage V1 are controlled according to a PID control process, which is a combination of a feed-forward control process and a feedback control process carried out by the converter controller 48.

(Output Control of the Fuel Cell 14)

According to the first embodiment, an output control process, described below, is carried out to effectively utilize the output (FC output Pfc) [W] of the fuel cell 14, while at the same time deterioration of the fuel cell 14 is suppressed.

First, an output characteristic curve (hereinafter referred to as "output characteristic curve Cfc") of the fuel cell 14 will be described below. Similar to a general fuel cell, the output characteristic curve Cfc of the fuel cell 14 makes the FC output Pfc higher as the FC voltage Vfc goes lower (see FIG. 4). According to the first embodiment, the DC/DC converter apparatus 50 controls the secondary voltage V2 in order to control the FC voltage Vfc of the fuel cell 14, for thereby controlling the FC output Pfc of the fuel cell 14.

Figure 4:
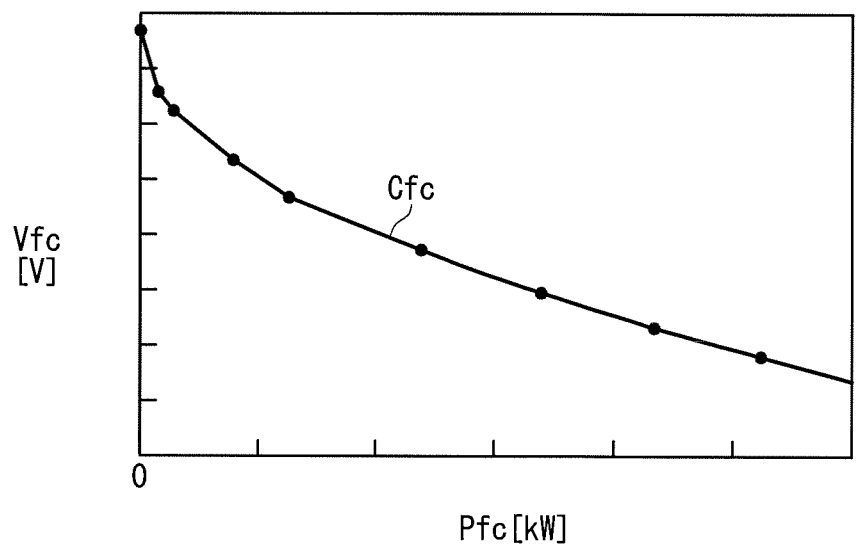
FIG. 4 is a diagram showing an output-voltage characteristic curve of a fuel cell mounted on the fuel cell vehicle.

As shown in FIG. 4, as the FC output Pfc becomes lower, the FC voltage Vfc changes quadratically. As the FC voltage Vfc changes, the fuel cell 14 becomes more deteriorated.

Figure 5:
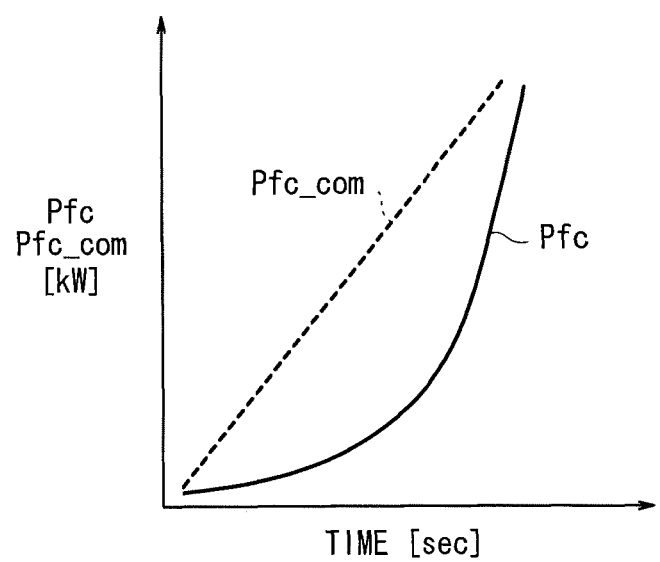
FIG. 5 is a diagram showing an output control characteristic curve of the fuel cell according to the first embodiment, and an output control characteristic curve of a fuel cell according to a comparative example.

According to the first embodiment, in view of the above feature, increasing of the FC output Pfc is limited, as shown in FIG. 5. FIG. 5 shows a solid-line curve representative of the FC output Pfc of the fuel cell 14 according to the first embodiment, and a broken-line curve representative of the output (hereinafter referred to as "FC output Pfc_com") [W] of a fuel cell 14 according to a comparative example. As shown in FIG. 5, the FC output Pfc_com of the fuel cell 14 according to the comparative example has a constant rate of change (hereinafter referred to as "output change ΔPfc_com") per unit time [W/sec]. According to the first embodiment, a limitation (hereinafter referred to as "allowable change α") [V/sec] is set with respect to a change (hereinafter referred to as "voltage change ΔVfc") per unit time [V/sec] in the FC voltage Vfc. The FC voltage Vfc is controlled so that the voltage change ΔVfc will not become equal to or greater than the allowable change α. Consequently, according to the first embodiment, changes in voltage of the fuel cell 14 are suppressed. Therefore, when the FC output Pfc is low, a change (hereinafter referred to as "output change ΔPfc") per unit time [W/sec] in the FC output Pfc is made smaller. Also, when the FC output Pfc is high, the output change ΔPfc is made greater.

Figure 6:
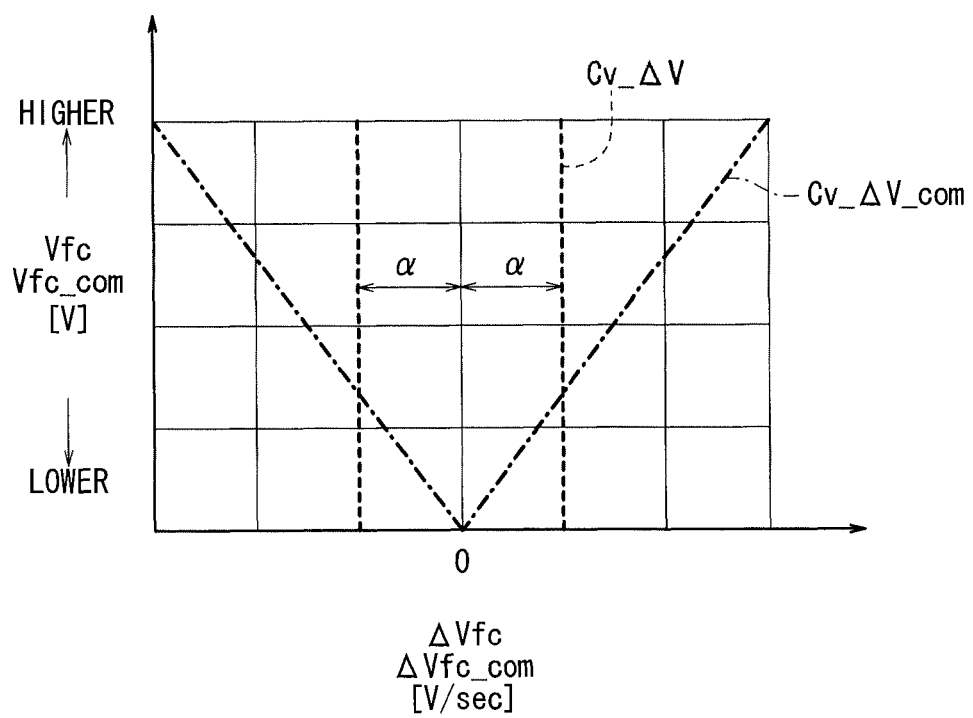
FIG. 6 is a diagram showing a voltage-voltage change characteristic curve of the fuel cell according to the first embodiment, and a voltage-voltage change characteristic curve of the fuel cell according to the comparative example.

FIG. 6 schematically illustrates an output control process according to the first embodiment, together with an output control process according to the comparative example. FIG. 6 shows a broken-line characteristic curve (hereinafter referred to as "output control characteristic curve Cv_ΔV") representative of the relationship between the FC voltage Vfc and the voltage change ΔVfc used in the output control process according to the first embodiment. FIG. 6 also shows a dot-and-dash-line characteristic curve (hereinafter referred to as "output control characteristic curve Cv_ΔV_com") representative of the relationship between the FC voltage Vfc_com and the voltage change ΔVfc_com used in the output control process according to the comparative example. As shown in FIG. 6, the output control characteristic curve Cv_ΔV_com according to the comparative example causes the absolute value of the voltage change ΔVfc_com to become greater as the FC voltage Vfc_com goes higher, and also causes the absolute value of the voltage change ΔVfc_com to become smaller as the FC voltage Vfc_com goes lower. However, the output control characteristic curve Cv_ΔV according to the first embodiment limits the absolute value of the voltage change ΔVfc to the allowable change α, even when the FC voltage Vfc becomes higher.

FIG. 7 is a table of output changes [W/sec] and voltage changes [V/sec] classified by different output levels [W], for the FC output Pfc_com of the fuel cell according to the comparative example, as well as for the FC output Pfc of the fuel cell according to the first embodiment.

As shown in FIG. 7, according to the comparative example, the output change (i.e., the output change ΔPfc_com) remains constant when the fuel cell 14 produces a low output level, a medium output level, and a high output level, and the voltage change (i.e., the voltage change ΔVfc_com) becomes smaller as the output of the fuel cell 14 changes from the low output level to the high output level. In contrast, according to the first embodiment, the output change (i.e., the output change ΔPfc) becomes greater as the output of the fuel cell 14 changes from the low output level to the high output level, and the voltage change (i.e., the voltage change ΔVfc) remains constant when the fuel cell 14 produces a low output level, a medium output level, and a high output level.

(Output Control in the Fuel Cell Vehicle 10)

According to the first embodiment, as described above, a limitation is imposed on the output change ΔPfc per unit time in the FC output Pfc. Therefore, when the total demand load Lt on the FC vehicle 10 is quickly increased, e.g., when the FC vehicle 10 is quickly accelerated, the total demand load Lt cannot be met only by the FC output Pfc from the fuel cell 14. In such a case, an output [W] from the battery 12 (hereinafter referred to as "battery output Pbat") is utilized to make up for the shortage in the total demand load Lt.

Figure 8:
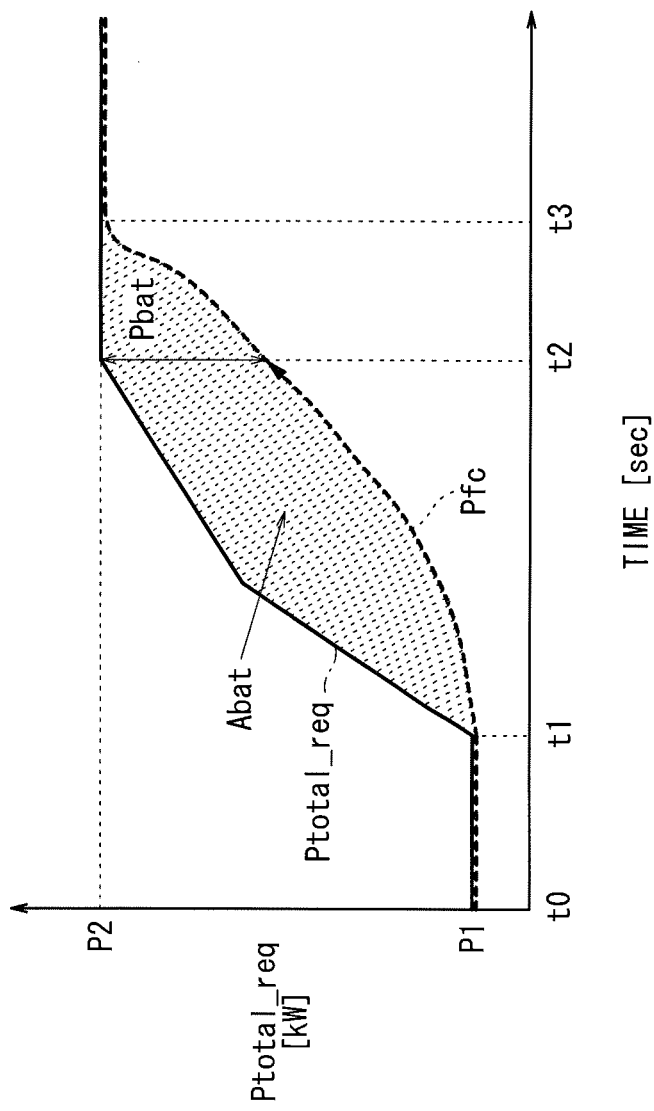
FIG. 8 is a diagram showing an example of a relationship between output of the fuel cell and a battery output at a time when the fuel cell vehicle changes from a cruise mode into a full-speed mode.

FIG. 8 schematically shows an example of a relationship between the FC output Pfc and the battery output Pbat, at a time when the FC vehicle 10 changes from a cruise mode into a full-speed mode. As shown in FIG. 8, the FC vehicle 10 cruises from time t0 to time t1, during which time the output (hereinafter referred to as "total required output Ptotal_req") [W] required by the FC vehicle 10 is an output (hereinafter referred to as "cruise required output P1") [W] required to maintain the FC vehicle 10 in a cruising state.

At time t1, when the throttle of the FC vehicle 10 is fully opened, i.e., when the FC vehicle 10 is in a wide open throttle (WOT) state, the total required output Ptotal_req quickly increases. However, since the output change ΔPfc of the fuel cell 14 is limited so as not to exceed the allowable change α, the FC output Pfc cannot catch up with the change in the total required output Ptotal_req. At this time, the battery output Pbat is used to make up for the shortage of the total required output Ptotal_req.

At time t2, the total required output Ptotal_req reaches a maximum required output P2 [W] for propelling the FC vehicle 10 at full speed. At time t3, when the FC output Pfc has reached the maximum required output P2 [W] and is equal to the total required output Ptotal_req, the FC output Pfc will subsequently cover the total required output Ptotal_req in its entirety.

In FIG. 8, the area enclosed by the total required output Ptotal_req and the FC output Pfc from time t1 to time t3 represents an area (hereinafter referred to as "battery borne area Abat") that is borne by the battery 12.

(Specific Flowchart)

Figure 9:
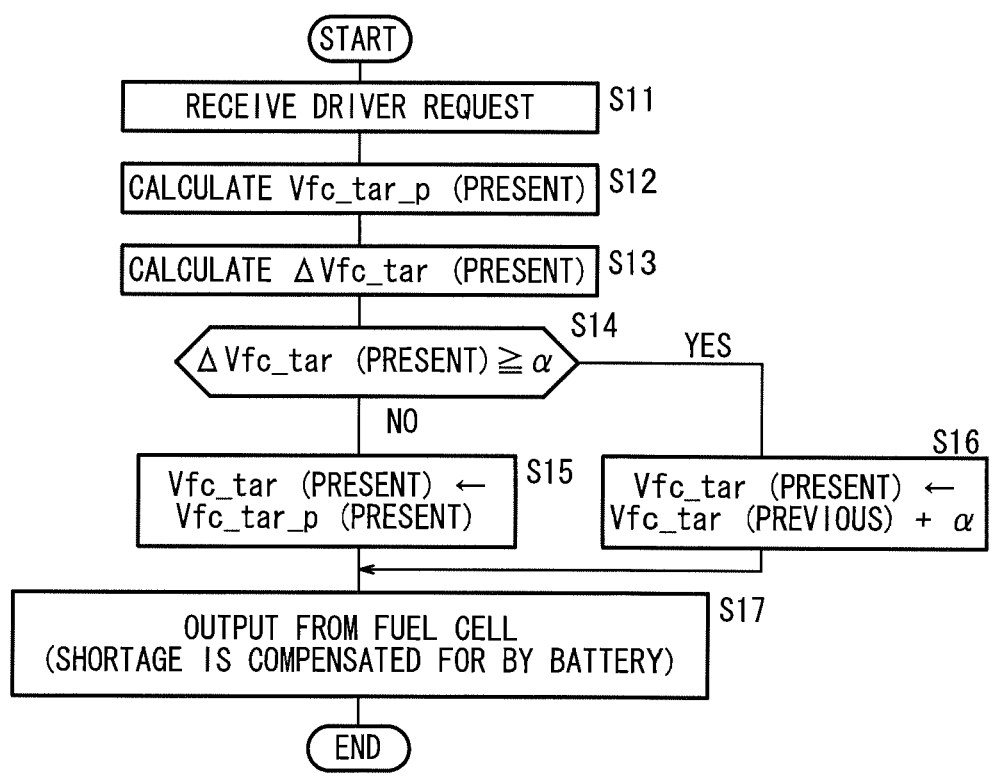
FIG. 9 is a flowchart of a processing sequence for limiting a change per unit time in the output of the fuel cell.

FIG. 9 is a flowchart of a processing sequence for limiting the output change ΔPfc in the FC output Pfc. According to the first embodiment, as described above, the FC voltage Vfc is controlled by controlling the secondary voltage V2.

As shown in FIG. 9, in step S11, in response to a request from the driver of the FC vehicle 10, the general controller 40 calculates a command for the FC voltage Vfc, and sends the calculated command to the converter controller 48. In step S12, the converter controller 48 calculates a provisional target value (hereinafter referred to as "provisional target FC voltage Vfc_tar_p") [V] for the FC voltage Vfc by adding a feed-forward term based on the command from the general controller 40, and a feedback term based on a PID control process. For illustrative purposes, a provisional target FC voltage Vfc_tar_p, which is calculated in a present cycle, will be marked with the term "present", whereas a provisional target FC voltage Vfc_tar_p, which is calculated in a previous cycle, will be marked with the term "previous".

In step S13, the converter controller 48 calculates a target value {target voltage change ΔVfc_tar (present)} [V/sec] for the voltage change ΔVfc as a difference between the target value {target FC voltage Vfc_tar (previous)} for the FC voltage Vfc, which was actually used in the previous cycle, and the present provisional target FC voltage Vfc_tar_p (present). The provisional target FC voltage Vfc_tar_p (present) represents a value before the output change ΔPfc is limited, whereas the target FC voltage Vfc_tar (present), which is actually used, is a value after the output change ΔPfc has been limited. Therefore, the drive signals UH, UL output to the DC/DC converter 20 are generated directly based on the target FC voltage Vfc_tar (present).

In step S14, the converter controller 48 determines whether or not the target voltage change ΔVfc_tar (present) calculated in step S13 is equal to or greater than an allowable change α. If the target voltage change ΔVfc_tar (present) is smaller than the allowable change α (S14: NO), then in step S15, the converter controller 48 sets the provisional target FC voltage Vfc_tar_p (present) calculated in step S12 as a target FC voltage Vfc_tar (present) to actually be used in the present cycle. If the target voltage change ΔVfc_tar (present) is equal to or greater than the allowable change α (S14: YES), then in step S16, the converter controller 48 sets the sum of the previous target FC voltage Vfc_tar (previous) and the allowable change α as a target FC voltage Vfc_tar (present) to actually be used in the present cycle.

In step S17, the converter controller 48 operates the DC/DC converter 20 based on the target FC voltage Vfc_tar (present), as determined in step S15 or step S16, thereby increasing the primary voltage V1 so that the secondary voltage V2 will be equalized to the target FC voltage Vfc_tar (present).

According to the first embodiment, as described above, the FC voltage Vfc is controlled by controlling the secondary voltage V2 with the DC/DC converter controller 48. Therefore, instead of using the provisional target FC voltage Vfc_tar_p and the target FC voltage Vfc_tar, the converter controller 48 actually controls the DC/DC converter 20 using a provisional target value (provisional target secondary voltage V2_tar_p") [V] for the secondary voltage V2, which is calculated by adding a feed-forward term based on a command from the general controller 40 and a feedback term based on a PID control process, and by using the target secondary voltage V2_tar [V], which is a value after the target output change ΔPfc_tar has been limited with respect to the provisional target secondary voltage V2_tar_p. According to the above alternative, the target voltage change ΔVfc_tar is calculated as a difference between the previous target secondary voltage V2_tar and the present provisional target secondary voltage V2_tar_p.

3. Advantages of the First Embodiment

According to the first embodiment, as described above, the FC output Pfc can effectively be utilized without fully limiting changes in the FC output Pfc, while at the same time deterioration of the fuel cell 14 is suppressed.

More specifically, according to the characteristics of the fuel cell 14, similar to a general fuel cell, as the FC output Pfc becomes lower, the FC voltage Vfc changes quadratically. Stated otherwise, as the output of the fuel cell 14 becomes lower, the change in the FC voltage Vfc, which depends on a change in the FC output Pfc, becomes greater. As the FC voltage Vfc changes more greatly, the fuel cell 14 becomes more deteriorated. According to the first embodiment, a change (voltage change ΔVfc) per unit time in the FC voltage Vfc is limited so as to make the allowable output change per unit time of the fuel cell 14 smaller when the FC output Pfc is low than when the FC output Pfc is high. In this manner, a change in the voltage of the fuel cell 14 is limited, thereby suppressing deterioration of the fuel cell 14.

Conversely, as the output of the fuel cell 14 becomes higher, a change in the FC voltage Vfc, which depends on a change in the FC output Pfc, becomes smaller. When the output of the fuel cell 14 is high, therefore, by increasing a change in the FC output Pfc, the change in the FC voltage Vfc does not become larger than when the output of the fuel cell 14 is low. According to the first embodiment, the allowable output change per unit time of the fuel cell 14 is set to a larger value when the FC output Pfc is high than when the FC output Pfc is low. When the output of the fuel cell 14 is high, which comparatively does not tend to cause a change in the FC output Pfc or result in deterioration of the fuel cell 14, the output performance of the fuel cell 14 can be produced more efficiently, and hence the FC output Pfc can be utilized effectively.

According to the first embodiment, when the FC output Pfc alone is unable to meet the total required output Ptotal_req, the shortage thereof is made up for by the battery output Pbat. Since the shortage of the total required output Ptotal_req is compensated for by the battery 12, it is possible to meet the total required output Ptotal_req, while at the same time deterioration of the fuel cell 14 is suppressed.

According to the first embodiment, the PC output Pfc is limited by imposing a limitation on the voltage change ΔVfc. The output control of the fuel cell 14 can thus effectively be carried out through a simple control process. More specifically, as shown in FIG. 4, the FC output Pfc of the fuel cell 14 changes quadratically with respect to the FC voltage Vfc, similar to a general fuel cell. With the voltage change ΔVfc being limited, when the FC output Pfc is low, the output change ΔPfc is limited so as to become reduced, whereas when the FC output Pfc is high, the output change ΔPfc is allowed even if the output change ΔPfc is large. Consequently, the computational effort required to limit the voltage change ΔVfc can be kept comparatively small.

B. Second Embodiment

1. Description of the Arrangement

Differences from the First Embodiment

Figure 10:
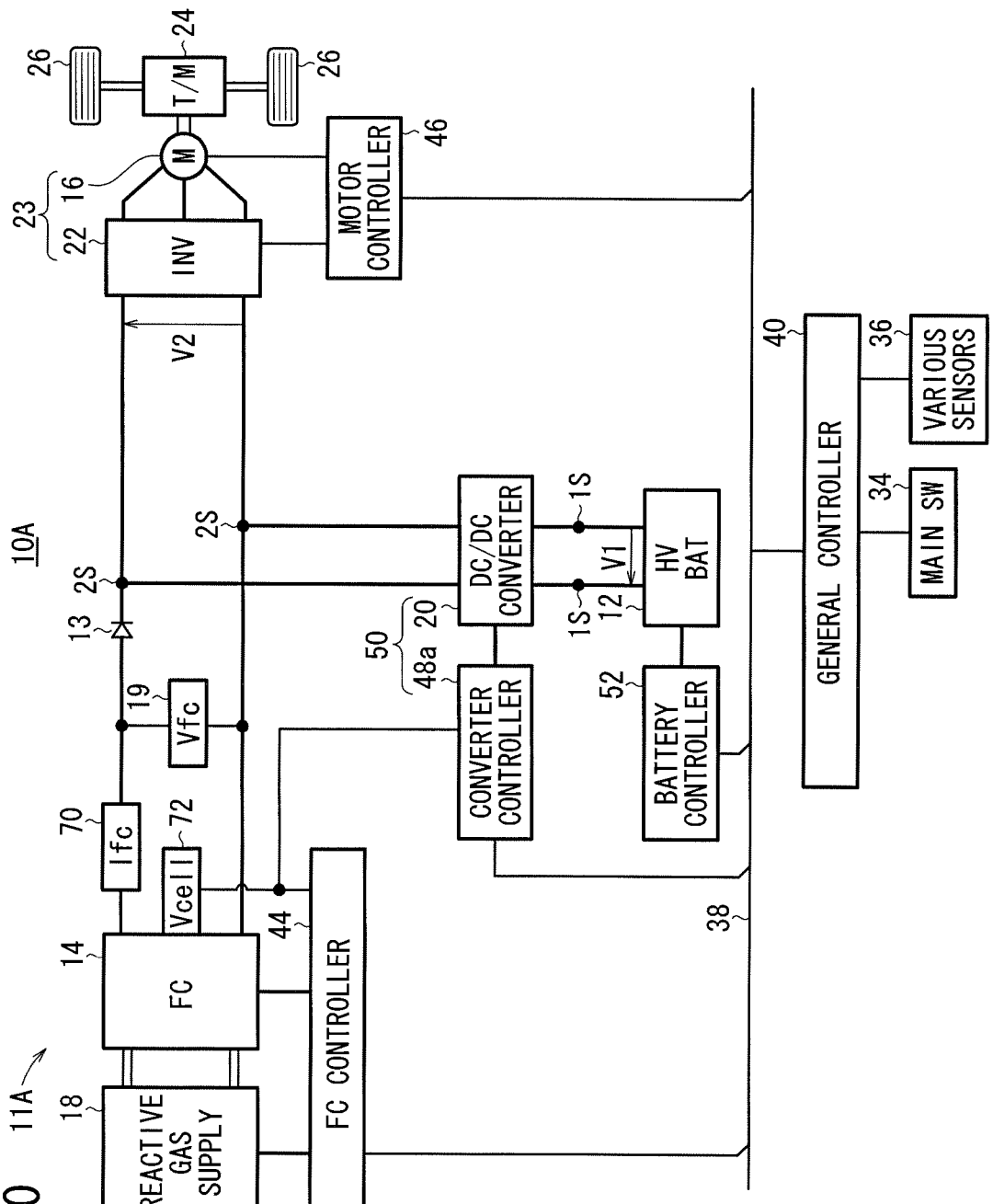
FIG. 10 is a block diagram of a fuel cell vehicle incorporating a fuel cell system in which an output control method according to a second embodiment of the present invention is carried out.

FIG. 10 is a block diagram of a fuel cell vehicle 10A (hereinafter referred to as "FC vehicle 10A") incorporating a fuel cell system 11A in which an output control method according to a second embodiment of the present invention is carried out.

The FC vehicle 10A is basically the same as the FC vehicle 10 according to the first embodiment. Parts of the FC vehicle 10A that are identical to those of the FC vehicle 10 according to the first embodiment are denoted by identical reference characters, and such features will not be described in detail below.

The FC vehicle 10A is different from the FC vehicle 10 according to the first embodiment, in that it includes a current sensor 70 for detecting an output current (FC current Ifc) [A] from the fuel cell 14, and a voltage sensor 72 for detecting a voltage (cell voltage Vcell) [V] of each cell (not shown) of the fuel cell 14. The FC vehicle 10A also has a converter controller 48a, which uses the FC current Ifc and the cell voltage Vcell during control operations thereof.

2. Control Process According to the Second Embodiment

The control process according to the second embodiment is basically the same as the control process according to the first embodiment, except for the process of determining the target secondary voltage V2_tar (or the target FC voltage Ffc_tar). Stated otherwise, while the control process according to the first embodiment is performed both when the FC voltage Vfc is increased as well as when the FC voltage Vfc is reduced, the control process according to the second embodiment is performed only when the FC voltage Vfc is increased.

Figure 11:
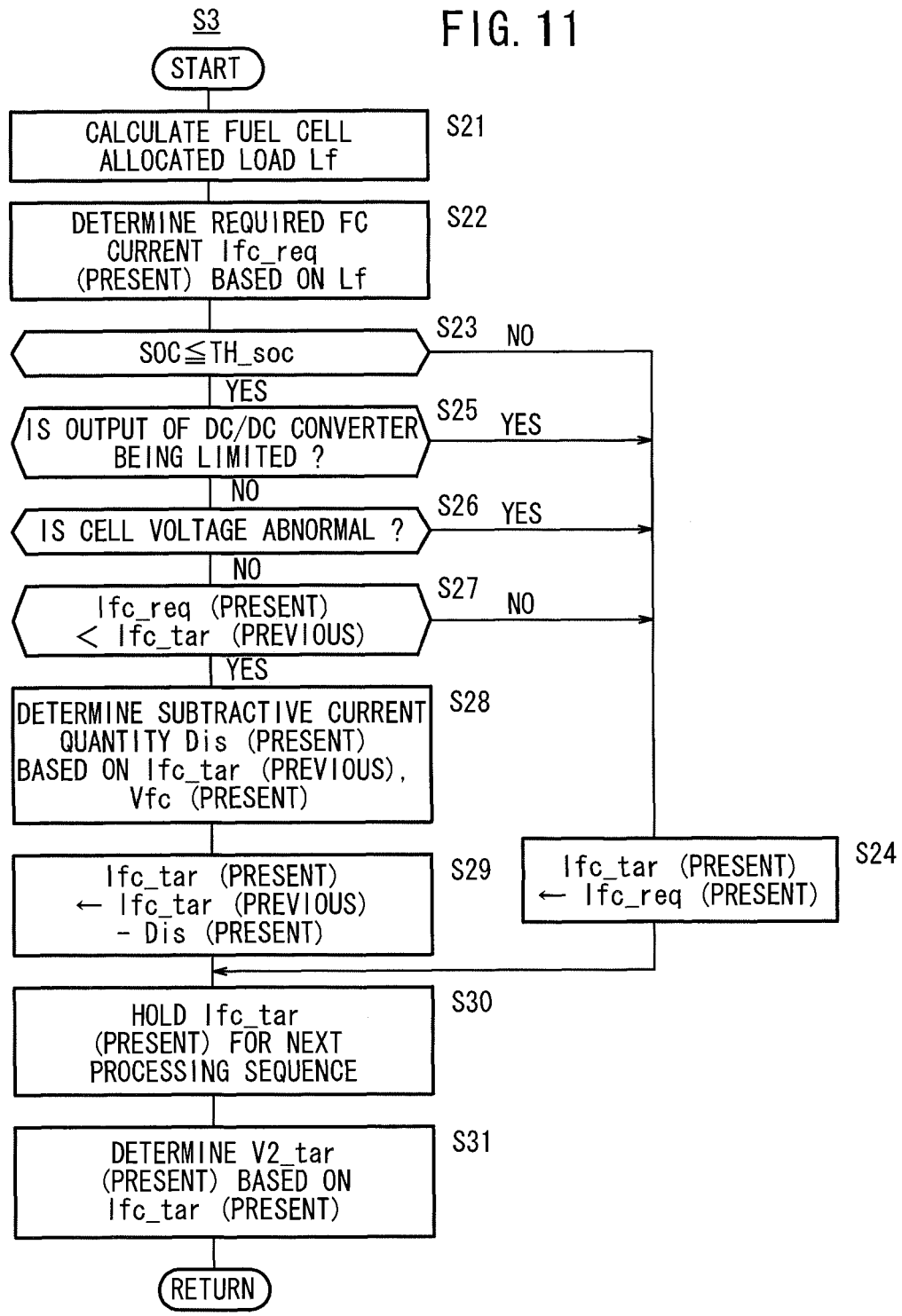
FIG. 11 is a flowchart of a processing sequence for determining a target secondary voltage according to the second embodiment.

FIG. 11 is a flowchart of a processing sequence for determining the target secondary voltage V2_tar according to the second embodiment. The processing sequence shown in FIG. 11 corresponds to step S3 in FIG. 3. For illustrative purposes, values that are calculated during a present cycle are marked with the term "present", whereas values that are calculated in a previous cycle are marked with the term "previous", in the same manner as the processing sequence according to the first embodiment shown in FIG. 9.

As shown in FIG. 11, in step S21, the general controller 40 calculates a fuel cell allocated load Lf, and sends the calculated fuel cell allocated load Lf to the converter controller 48a. In step S22, the converter controller 48a determines an FC current Ifc {required FC current Ifc_req (present)}, which corresponds to the received fuel cell allocated load Lf. The output of the fuel cell 14 is calculated from the FC voltage Vfc and the FC current Ifc. A combination of the fuel cell allocated load Lf and the required FC current Ifc_req, based on the I-V characteristic of the fuel cell 14, is stored in a memory means (not shown) of the converter controller 48a. The required FC current Ifc_req is read from the memory means using the fuel cell allocated load Lf.

In step S23, the converter controller 48a checks the battery controller 52 to see whether or not a start of charge SOC [%] of the battery 12 is equal to or smaller than a threshold value TH_soc. The threshold value TH_soc is a threshold value for the state of charge SOC, which is used to determine whether or not the battery 12 has been charged excessively. If the state of charge SOC is in excess of the threshold value TH_soc, then the battery 12 is judged as being excessively charged.

If the converter controller 48a receives a response from the battery controller 52 indicating that the state of charge SOC is in excess of the threshold value TH_soc (S23: NO), then the battery 12 could possibly become deteriorated due to excessive charging, as a result of limiting a reduction in the output of the fuel cell 14 and delivering an excessive output from the fuel cell 14 to charge the battery 12. Therefore, in step S24, the converter controller 48a does not limit the reduction in the output of the fuel cell 14, but rather sets the required FC current Ifc_req (present) as a target value (target FC current Ifc_tar) for the FC current Ifc. Then, the control sequence proceeds to step S30.

On the other hand, if the converter controller 48a receives a response from the battery controller 52 indicating that the state of charge SOC is equal to or smaller than the threshold value TH_soc (S23: YES), then the battery 12 will not become unduly deteriorated due to excessive charging caused by limiting a reduction in the output of the fuel cell 14 and delivering an excessive output from the fuel cell 14 to charge the battery 12.

In step S25, the converter controller 48a confirms whether or not the output of the DC/DC converter 20 is being limited. The output of the DC/DC converter 20 may be limited when the DC/DC converter 20 is broken down, or when the upper arm switching element 81 becomes overheated. If the output of the DC/DC converter 20 is being limited (S25: YES), then assuming the reduction in the output of the fuel cell 14 also is limited, excessive output from the fuel cell 14 is supplied via the DC/DC converter 20 to the battery 12, with the result that the output from the DC/DC converter 20 increases. Therefore, if the output of the DC/DC converter 20 is being limited, then a reduction in the output of the fuel cell 14 cannot be limited. Accordingly, in step S24, the converter controller 48a does not limit the reduction in the output of the fuel cell 14, but rather sets the required FC current Ifc_req (present) as a target FC current Ifc_tar.

On the other hand, if the output of the DC/DC converter 20 is not being limited (S25: NO), then the above problem does not arise as a result of limiting the reduction in the output of the fuel cell 14 and supplying an excessive output from the fuel cell 14 to the battery 12 via the DC/DC converter 20. Therefore, in this case, control proceeds to step S26.

In step S26, the converter controller 48a determines whether the cell voltage Vcell detected by the voltage sensor 72 is abnormal or not. When the cell voltage Vcell is abnormal, this implies that the cell voltage Vcell is lower than normal due to deterioration of the cells of the fuel cell 14. Generally, as the fuel cell 14 becomes more deteriorated, the FC voltage Vfc becomes lower in spite of the FC current Ifc remaining the same, thus making the gradient of an I-V characteristic curve of the fuel cell 14 steeper in a low load range (see FIG. 12). Consequently, if a reduction in the output of the fuel cell 14 is limited, then the rate at which the output of the fuel cell 14 is reduced is limited excessively.

If the cell voltage Vcell is abnormal (S26: YES), then, in step S24, the converter controller 48a does not limit the reduction in the output of the fuel cell 14, but rather sets the required FC current Ifc_req (present) as the target FC current Ifc_tar. If the cell voltage Vcell is not abnormal (S26: NO), then the above problem does not arise as a result of limiting the reduction in the output of the fuel cell 14. Therefore, in this case, control proceeds to step S27.

In step S27, the converter controller 48a determines whether or not the required FC current Ifc_req (present) is smaller than a target FC current Ifc_tar (previous). If the required FC current Ifc_req (present) is not smaller than the target FC current Ifc_tar (previous) (S27: NO), then the fuel cell 14 will not become deteriorated by an increase in the FC voltage Vfc, and there is no need to limit the reduction in the output of the fuel cell 14. Thus, in step S24, the converter controller 48a does not limit the reduction in the output of the fuel cell 14, but rather sets the required FC current Ifc_req (present) as a target FC current Ifc_tar.

If the required FC current Ifc_req (present) is smaller than the target FC current Ifc_tar (previous) (S27: YES), then the fuel cell 14 possibly could become deteriorated due to an increase in the FC voltage Vfc. Therefore, it is necessary to limit the reduction in the output of the fuel cell 14.

In step S28, the converter controller 48a determines a subtractive current quantity Dis [A] depending on the target FC current Ifc_tar (previous) and the FC voltage Vfc (present). The subtractive current quantity Dis represents a reduction in the FC current Ifc that is allowed in one process.

Figure 12:
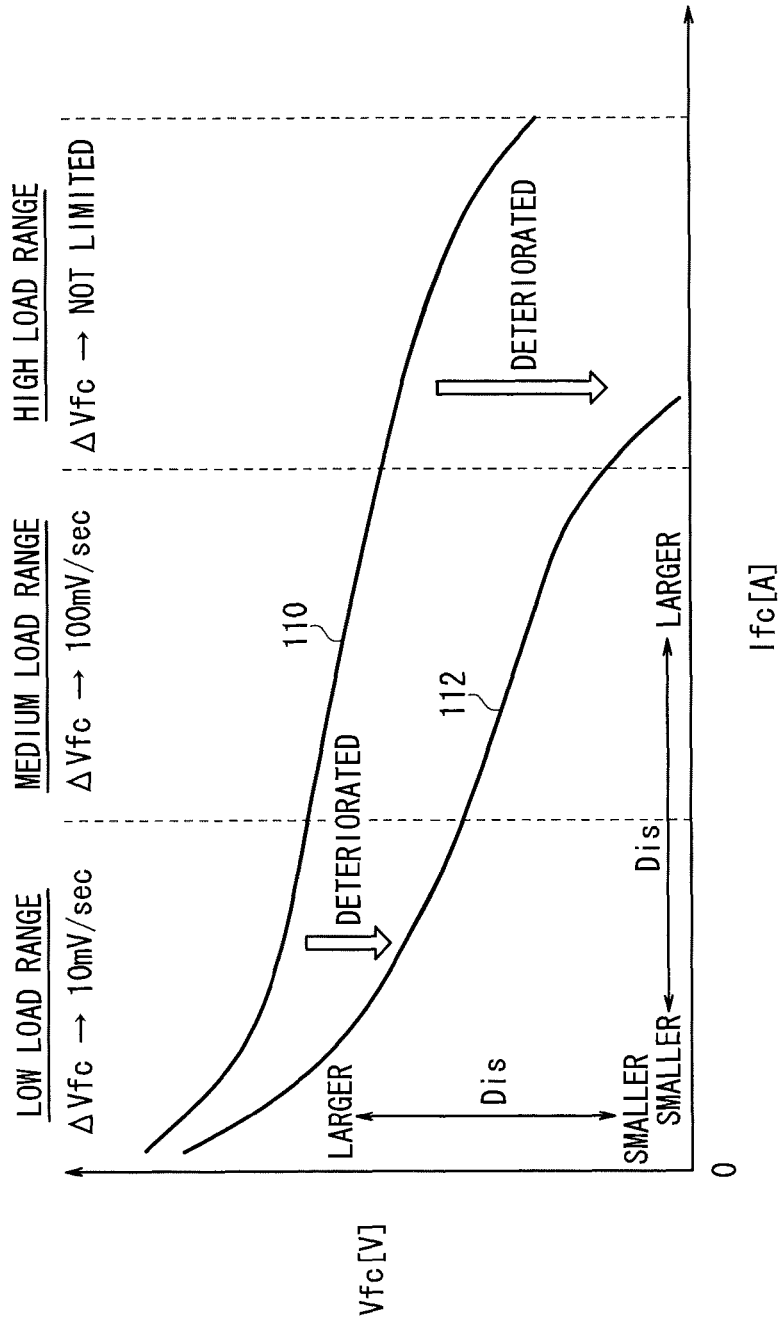
FIG. 12 is a diagram showing a process of determining a subtractive current quantity according to the second embodiment.

FIG. 12 is a diagram showing a process of determining the subtractive current quantity Dis. In FIG. 12, curve 110 represents an I-V characteristic curve of the fuel cell 14 before the fuel cell 14 becomes deteriorated, whereas curve 112 represents an I-V characteristic curve of the fuel cell 14 after the fuel cell 14 has become deteriorated.

According to the second embodiment, as shown in FIG. 12, the FC current Ifc is divided into three ranges. In a range where the FC current Ifc is low (low load range), the change per unit time in the FC voltage Vfc (voltage change ΔVfc) is limited to 10 mV/sec. In a range where the FC current Ifc is medium (medium load range), the voltage change ΔVfc is limited to 100 mV/sec. In a range where the FC current Ifc is high (high load range), no limitation is imposed on the voltage change ΔVfc. Since the fuel cell 14 tends to become more deteriorated as the FC voltage Vfc becomes higher, the limitation imposed on the voltage change ΔVfc is able to prevent the fuel cell 14 from becoming unduly deteriorated, and enables the output of the fuel cell 14 in the high load range (and the medium load range) to be utilized effectively.

As shown in FIG. 12, as the deterioration of the fuel cell 14 progresses, the FC voltage Vfc becomes lowered even though the FC current Ifc remains the same, thus making the gradient of the I-V characteristic curve steeper in the low load range.

Based on the above tendency, according to the present invention, a subtractive current quantity Dis, which depends on the target FC current Ifc_tar (previous) and the FC voltage Vfc (present), is stored as a map in order to make the limitation on the voltage change ΔVfc constant in both low and medium load ranges, while taking into account changes in the I-V characteristic curve caused by deterioration of the fuel cell 12. The map representing the relationship between the target FC current Ifc_tar (previous), the FC voltage Vfc (present), and the subtractive current quantity Dis is stored in a non-illustrated memory means of the converter controller 48a.

In order to make the limitation on the voltage change ΔVfc constant in both low and medium load ranges regardless of deterioration of the fuel cell 14, the map is arranged such that the subtractive current quantity Dis becomes smaller as the target FC current Ifc_tar (previous) becomes smaller, and also as the FC voltage Vfc (present) becomes lower (see FIG. 12). In FIG. 12, specific numerical values of the map have not been illustrated.

As shown in FIG. 11, in step S29, the converter controller 48a subtracts the subtractive current quantity Dis (present) from the target FC current Ifc_tar (previous), and sets the difference as the target FC current Ifc_tar (present).

After step S24 or after step S29, the converter controller 48a stores and maintains the target FC current Ifc_tar (present) in the non-illustrated memory means for the next processing sequence in step S30. In step S31, the converter controller 48a determines a target secondary voltage V2_tar based on the target FC current Ifc_tar (present). In calculating the target secondary voltage V2_tar, the converter controller 48a brings the secondary voltage V2 (FC voltage Vfc) into conformity with the target secondary voltage V2_tar (target FC voltage Vfc_tar), also by using a feedback control process such as a PID control process or the like.

3. Advantages of the Second Embodiment

The second embodiment offers the advantages described below, in addition to the advantages offered by the first embodiment.

According to the second embodiment, in a low load range, the target FC current Ifc_tar (present) is determined such that the voltage change ΔVfc, which represents a change per unit time in the FC voltage Vfc, is kept within 10 mV/sec. In a medium load range, the target FC current Ifc_tar (present) is determined such that the voltage change ΔVfc is kept within 100 mV/sec. In a high load range, the target FC current Ifc_tar (present) is determined regardless of the voltage change ΔVfc. Thus, even if the I-V characteristic of the fuel cell 14 changes due to deterioration of the fuel cell 14, thus causing the FC voltage Vfc to change greatly with respect to changes in the FC current Ifc, it is still possible to maintain the voltage change ΔVfc at a constant value.

According to the second embodiment, changes in the target FC current Ifc_tar are limited before the target secondary voltage V2_tar is calculated. Therefore, the computational effort can be made simpler than if the limitation of such changes in the target FC current Ifc_tar were reflected in the calculation of the target secondary voltage V2_tar. According to the second embodiment, in particular, the computational effort can further be reduced, because the relationship between the target FC current Ifc_tar (previous), the FC voltage Vfc (present), and the subtractive current quantity Dis (present) is stored as a map.

C. Modifications

The present invention is not limited to the above embodiments, but various changes and modifications may be made to the present invention within the scope of the invention. Examples of such changes and modifications shall be described below.

[Applicable Objects]

In the above embodiments, the fuel cell systems 11, 11A are incorporated into respective FC vehicles 10 and 10A. However, the fuel cell systems 11, 11A may be incorporated into other mobile bodies, such as ships, aircraft, etc. The fuel cell systems 11, 11A may alternatively be applied to an electric power system for home use.

[DC/DC Converter]

In the above embodiments, the DC/DC converter 20 has one upper arm switching element 81 and one lower arm switching element 82. However, the DC/DC converter 20 may have two or more upper arm switching elements 81 and two or more lower arm switching elements 82.

[Output Control]

In the above embodiments, the FC output Pfc is controlled by controlling the secondary voltage V2 or the FC voltage Vfc. However, outputs from each of the cells of the fuel cell 14 may be controlled by controlling a cell voltage Vcell [V] of each of the cells of the fuel cell 14.

In the above embodiments, the FC output Pfc is limited by imposing a limitation on the change (voltage change ΔVfc) per unit time in the FC voltage Vfc. However, since the allowable change per unit time in the output of the fuel cell 14 is different in high and low output ranges of the FC output Pfc, a limitation may be imposed on other quantities, so long as the output change permitted in the low output range is smaller than the output change permitted in the high output range. For example, the FC output Pfc may be determined from the FC voltage Vfc using an output-voltage characteristic curve (see FIG. 4) of the fuel cell 14, and a limitation may be imposed on a change per unit time [W/sec] in the FC output Pfc itself. In such a case, an allowable change β [W/sec] for the change per unit time in the FC output Pfc may be preset, whereby the change per unit time in the FC output Pfc is controlled so as not to become equal to or greater than the allowable change β.

According to the second embodiment, in FIG. 11, a limitation by use of the subtractive current quantity Dis is not performed if the state of charge SOC of the battery 12 is in excess of the threshold value TH_soc (S23: NO), or if the output of the DC/DC converter 20 is currently being limited (S25: YES), or if the cell voltage Vcell is abnormal (S26: YES), or if the required FC current Ifc_req (present) is not smaller than the target FC current Ifc_tar (previous) (S27: NO). However, any of these conditional branches may not be used, or may be selectively used. Furthermore, rather than not effecting a limitation using the subtractive current quantity Dis, the subtractive current quantity Dis may be increased.

According to the second embodiment, in FIG. 11, the subtractive current quantity Dis is determined in step S28 after the required FC current Ifc_req (present) and the target FC current Ifc_tar (previous) have been compared with each other in step S27. However, step S28 may be carried out before step S27. In such a case, in step S27, it may be determined whether or not the required FC current Ifc_req (present) is smaller than a difference between the target FC current Ifc_tar (previous) and the subtractive current quantity Dis {Ifc_req (present)<Ifc_tar (previous)−Dis (present)}. If the difference between the target FC current Ifc_tar (previous) and the required FC current Ifc_req (present) is smaller than the subtractive current quantity Dis, then the target FC current Ifc_tar (present) can be set using smaller intervals.

Although certain preferred embodiments of the present invention have been shown and described in detail, it should be understood that various changes and modifications may be made to the embodiments without departing from the scope of the invention as set forth in the appended claims.

What is claimed is:

1. A method of controlling output of a fuel cell system including a fuel cell and a load, comprising the steps of:
   setting different allowable changes per unit time in an electrical power output range of the fuel cell in both a first output range of the fuel cell and a second output range of the fuel cell, the second output range being lower in electrical power output than the first output range;
   setting the allowable change per unit time in the electrical power output of the fuel cell in the second output range so as to be smaller than the allowable change per unit time in the electrical power output of the fuel cell in the first output range;
   determining a change per unit time in the electrical power output of the fuel cell in the second output range based on an output current and an output voltage of the fuel cell; and
   setting the allowable change per unit time in the electrical power output of the fuel cell in the second output range so as to be smaller as the output current of the fuel cell becomes smaller and as the output voltage of the fuel cell becomes smaller.

2. A method according to claim 1, wherein the allowable change per unit time in the electrical power output of the fuel cell in the second output range is determined such that a change per unit time in the voltage of the fuel cell is kept within a constant value; and
   a change per unit time in the voltage of the fuel cell in the first output range is not limited, or is limited so as to be kept within a value greater than the constant value.

3. A method according to claim 1, wherein the fuel cell system comprises a system for determining a target voltage of the fuel cell based on a target electric power or a target current of the fuel cell, and further comprising the step of performing a feedback control process for bringing the voltage of the fuel cell into conformity with the target voltage with a DC/DC converter,
   wherein the change per unit time in the electrical power output of the fuel cell in the first output range and the second output range falls within an allowable range by limiting the target electric power or the target current.

4. A method according to claim 1, wherein the fuel cell system further includes a battery,
   wherein when the electrical power output of the fuel cell alone fails to meet an output request from the fuel cell system, the shortage of the output request is compensated for by an output of the battery.

5. A method according to claim 1, wherein a change per unit time in the voltage of the fuel cell is limited in order to limit the electrical power output of the fuel cell.

6. A vehicle incorporating a fuel cell system including a fuel cell and a load, wherein the fuel cell system comprises a control apparatus configured for
   setting different allowable changes per unit time in an operation range of the fuel cell in both a first output range of the fuel cell and a second output range of the fuel cell, the second output range being lower than the first output range,
   setting the allowable change per unit time in the electrical power output of the fuel cell in the second output range so as to be smaller than the allowable change per unit time in the electrical power output of the fuel cell in the first output range,
   determining a change per unit time in the electrical power output of the fuel cell in the second output range based on an output current and an output voltage of the fuel cell; and
   setting the allowable change per unit time in the electrical power output of the fuel cell in the second output range so as to be smaller as the output current of the fuel cell becomes smaller and as the output voltage of the fuel cell becomes smaller.

* * * * *